US006438264B1

(12) United States Patent
Gallagher et al.

(10) Patent No.: US 6,438,264 B1
(45) Date of Patent: Aug. 20, 2002

(54) METHOD FOR COMPENSATING IMAGE COLOR WHEN ADJUSTING THE CONTRAST OF A DIGITAL COLOR IMAGE

(75) Inventors: Andrew C. Gallagher; Edward B. Gindele, both of Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/224,028

(22) Filed: Dec. 31, 1998

(51) Int. Cl.$^7$ ................................................. G06K 9/00
(52) U.S. Cl. ........................ 382/167; 358/1.9; 358/518; 358/504; 382/162
(58) Field of Search ........................ 358/1.9, 460, 520, 358/504, 523, 518, 461, 455, 448, 501; 382/260, 263–266, 274, 382, 261, 169, 167, 168; 345/600–604

(56) References Cited

U.S. PATENT DOCUMENTS

| | | | | |
|---|---|---|---|---|
| 4,928,167 A | * | 5/1990 | Tatsumi et al. ................ 358/80 |
| 5,012,333 A | * | 4/1991 | Lee et al. ....................... 358/80 |
| 5,081,692 A | * | 1/1992 | Kwon et al. .................... 382/54 |
| 5,164,993 A | * | 11/1992 | Capozzi et al. ............... 378/901 |
| 5,426,517 A | * | 6/1995 | Schwartz ....................... 358/520 |
| 5,446,504 A |  | 8/1995 | Wada ........................... 348/645 |
| 5,638,138 A | * | 6/1997 | Hickman ....................... 348/678 |
| 5,642,204 A | * | 6/1997 | Wang ........................... 358/298 |
| 5,710,841 A | * | 1/1998 | Green et al. ................. 382/132 |
| 5,724,456 A | * | 3/1998 | Boyack et al. ............... 382/274 |
| 5,822,453 A | * | 10/1998 | Lee et al. ..................... 358/455 |
| 5,930,009 A | * | 7/1999 | Sato et al. .................... 358/518 |
| 6,118,907 A | * | 9/2000 | Matama ........................ 382/574 |
| 6,122,012 A | * | 9/2000 | Segman ........................ 345/601 |
| 6,167,165 A | * | 12/2000 | Gallagher et al. .......... 382/263 |
| 6,275,605 B1 | * | 8/2001 | Gallagher et al. .......... 382/162 |
| 6,282,312 B1 | * | 8/2001 | McCarthy .................... 382/162 |
| 6,285,784 B1 | * | 9/2001 | Spaulding et al. .......... 382/162 |
| 6,285,798 B1 | * | 9/2001 | Lee .............................. 382/260 |
| 6,317,521 B1 | * | 11/2001 | Gallagher et al. .......... 382/260 |

OTHER PUBLICATIONS

Photoshop6 for Windows Bible, Adobe Photoshop, IDG Books Worldwide, Inc., 2000, pp. 792–793.*
The Image Processing Handbook, 2$^{nd}$ Edition, John C. Russ, 1995, CRC Press Inc., pp. 262–268; 271–272; 275–277.*
J. A. Stephen Viggiano and C. Jeffrey Wang, 1992 TAGA Proceedings: *A Comparison Of Algorithms For Mapping Color Between Media Of Differing Luminance Ranges*, pp. 959–974.

* cited by examiner

Primary Examiner—Edward Coles
Assistant Examiner—Tia A. Carter
(74) Attorney, Agent, or Firm—David M. Woods

(57) ABSTRACT

A method of adjustment of the color saturation characteristics of a digital color image is performed in order to compensate for an applied luminance tone scale function. This method comprises of the steps of receiving a tone scale function, calculating a local slope of the tone scale function for each pixel of the digital color image, calculating a color saturation signal from the digital color image, and adjusting the color saturation signal of the digital color image for each of the pixels based on the calculated local slope.

12 Claims, 4 Drawing Sheets

METHOD FOR COMPENSATING IMAGE COLOR WHEN ADJUSTING THE CONTRAST OF A DIGITAL COLOR IMAGE

FIELD OF THE INVENTION

The invention relates generally to the field of digital color image processing and, more particularly, for compensating the image color differences for the applied luminance tone scale.

BACKGROUND OF THE INVENTION

There exist in the prior art several methods of applying a tone scale function to a color image. The first method involves applying the tone scale function to each of the color signals of the original image. This may be implemented by applying a tone scale function Look-Up-Table to each of the red, green, and blue channels of an image independently. In general, tone scale application by this method has a color characteristic in addition to the modification of the overall image contrast. The image processed by a tone scale function in the manner described will effect each pixel's hue and saturation.

A second method of tone scale application involves rotating a color image into a space consisting of a luminance signal and several chrominance channels. The tone scale function is then applied only to the luminance channel. The processed image is obtained by applying an inverse matrix to produce transformed red, green, and blue pixel values. This method preserves the original chrominance signal at each pixel. However, because the luminance contrast was modified and the chrominance contrast was preserved, the color saturation of the resulting image may appear artificial and unnatural.

In an effort to address this problem, Viggiano and Wang proposed (1992 TAGA Proceedings: *A Comparison of Algorithms for Mapping Color Between Media of Differing Luminance Ranges,* pp. 959–974) a method of scaling the chroma signal of a digital color image by a factor midway between unity and the ratio of the L* range of the reproduction and the original. However, this solution does not anticipate tone scale functions that vary the level of compression dependent upon the intensity of the input. Thus, a single factor that scales the chroma signal of the input image is inappropriate for a wide range of possible tone scale functions.

In addition, in U.S. Pat. No. 5,446,504, Wada describes a method to correct color saturation when compressing the dynamic range of an image. However, this method once again determines the correction factor based upon the relationship of the input image dynamic range and the output image dynamic range.

In addition, in U.S. Pat. No. 5,638,138, Hickman describes a method of modifying the luminance signal of an input image, then "multiplying the color components by a transfer ratio of modified luminance to unmodified luminance to obtain modified color components." However, this method again does not consider that a tone scale function may consist of several ranges of varying level of contrast compression or enhancement.

Thus, none of the methods described in the prior art have determined a specific color adjustment factor based upon both the intensity values of the pixel being processed and the given tone scale function. Consequently, there exists a need for a method of adjusting the color saturation of each image pixel by a factor related to the local slope of the given tone scale function.

SUMMARY OF THE INVENTION

The object of the present invention is directed to providing a superior method of compensating the color saturation characteristics of a digital color image for the application of a tone scale function. Briefly summarized, according to one aspect of the present invention, the invention resides in the steps of: (a) receiving a tone scale function; (b) calculating a local slope of the tone scale function for each pixel of the digital color image; (c) calculating a color saturation signal from the digital color image, and (d) adjusting the color saturation signal of the digital color image for each of the pixels based on the calculated local slope.

These and other aspects, objects, features and advantages of the present invention will be more clearly understood and appreciated from a review of the following detailed description of the preferred embodiments and appended claims, and by reference to the accompanying drawings.

DETAILED DESCRIPTION OF THE INVENTION

In the following description, the present invention will be described in the preferred embodiment as a software program. Those skilled in the art will readily recognize that the equivalent of such software may also be constructed in hardware.

Figure 1:
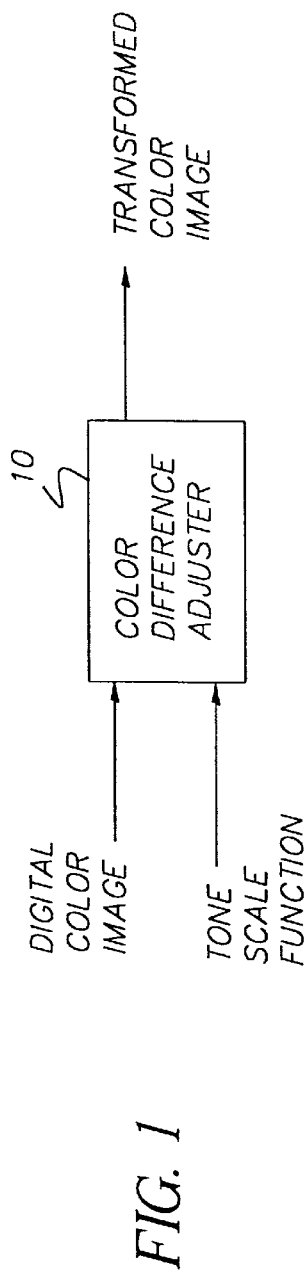
FIG. 1 is a block diagram illustrating an overview of the present invention.

Referring to FIG. 1, there is illustrated an overview of the present invention. It is instructive to note that the present invention utilizes a digital color image that is typically a two-dimensional array of red, green, and blue pixel values. The description of the present invention is applicable to an image of any resolution.

The purpose of the present invention is the modification of the color saturation characteristics of a color image in accordance with the luminance contrast modification. The color saturation characteristics of a color image may be represented by a color saturation signal. Those skilled in the art will recognize that color saturation signals may be calculated in a number of ways. For example, as one calculation of a color saturation signal, color difference signals may be calculated simply by implementing matrix multiplication on pixel values of the original image. Color difference signals refer to the difference of a color channel to a reference channel. A three channel color image consisting of a red, green, and blur channels may be converted to a three channel image consisting of a luminance channel and two color difference channels by matrix multiplication.

A single color saturation signal could be created by converting the two color difference signals to polar form by calculating an angle and a radius. The calculation of polar coordinates from rectangular coordinates is well known in the art and will not be further described. When such a conversion is performed, the radius of the polar representation of the color difference signals represents the color saturation signal. The method of the present invention could be performed with equal success on such a color saturation measure. However, because of the simplicity of calculating the color difference signals, the preferred embodiment of the present invention modifies the color difference signals as a means of modifying the color saturation characteristics.

As an alternative method of calculating a color saturation signal, in *The Reproduction of Colour*, Fifth Edition by Dr. R. W. G. Hunt, the calculation of CIE 1976 saturation is described to provide an objective measure of saturation for any color.

Those skilled in the art will readily recognize that although the present invention is described in regard to modification of color difference signals, similar operations performed on alternative image color saturation signals do not significantly deviate from the scope of the present invention.

The input image is passed into the color difference adjuster 10. The color difference adjuster adjusts the relative color difference of each pixel in the input image in accordance to a provided tone scale function, as will be further described. It is necessary to note that the provided tone scale function may be implemented as a LUT, or may be the implied tonal response of a device that resides in the imaging chain. The output of the color difference adjuster is a transformed color image with color difference signals modified to compensate for the tone scale function.

Figure 2:
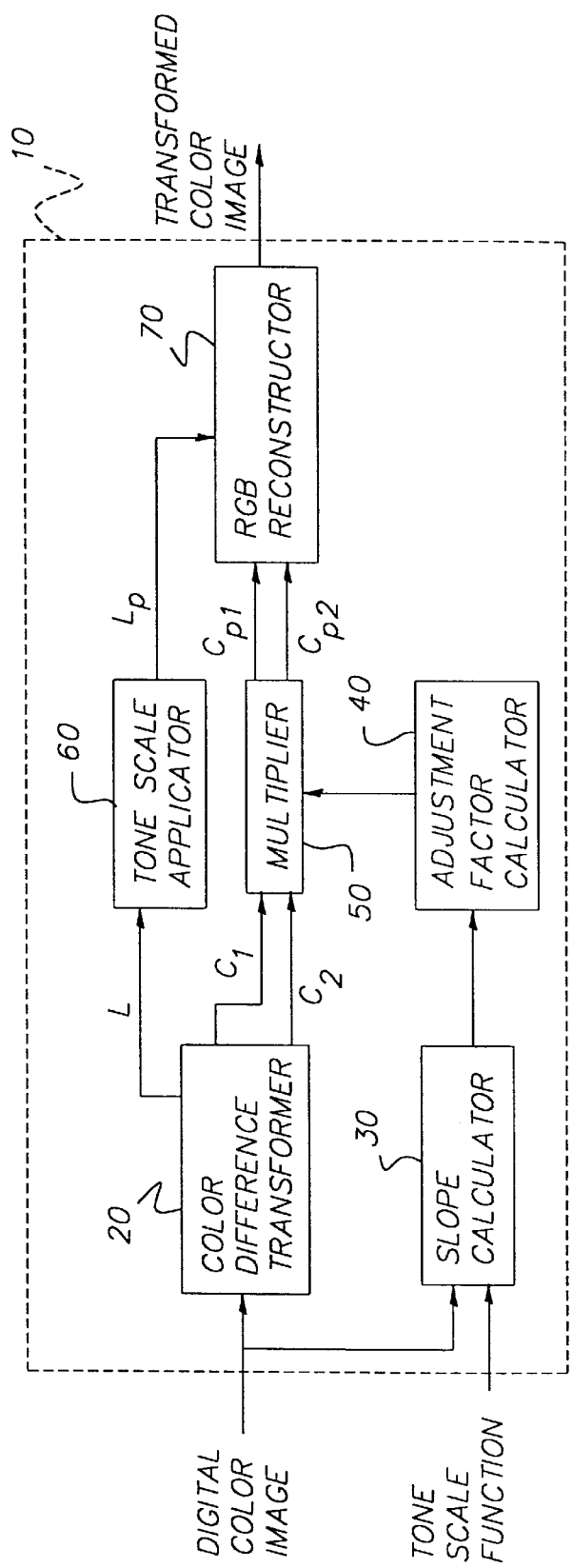
FIG. 2 is an exploded view of the color difference adjuster of FIG. 1.

Referring to FIG. 2, therein is illustrated an exploded view of the color difference adjuster 10. The preferred embodiment shown in FIG. 2 assumes that the input image has not yet been modified by the given tone scale. An alternative embodiment will describe a method of application of the present invention on an image that has already had the tone scale applied to the luminance channel of the image at the time the image is passed to the color difference adjuster 10. The color difference signals as well as a luminance signal of the original color image are computed by the color difference transformer 20. The computation of the color difference signals by the color difference transformer may be performed by a matrix operation. For example, in the preferred embodiment, a luminance signal and two color difference signals may be determined for each pixel of the input image by the following matrix transform:

$$\begin{bmatrix} \frac{1}{3} & \frac{1}{3} & \frac{1}{3} \\ -\frac{1}{4} & \frac{1}{2} & -\frac{1}{4} \\ -\frac{1}{2} & 0 & \frac{1}{2} \end{bmatrix} \begin{bmatrix} R \\ G \\ B \end{bmatrix} = \begin{bmatrix} L \\ C_1 \\ C_2 \end{bmatrix}$$

Where:

R, G, and B represent the original red, green, and blue intensities at a particular pixel;

L represents the luminance signal; and, $C_1$, $C_2$ represent the color difference signals.

In an alternative embodiment, a luminance signal and three color difference signals may be determined for each signal, also with a matrix transform:

$$\begin{bmatrix} \frac{1}{3} & \frac{1}{3} & \frac{1}{3} \\ -\frac{2}{3} & \frac{1}{3} & \frac{1}{3} \\ \frac{1}{3} & -\frac{2}{3} & \frac{1}{3} \\ \frac{1}{3} & \frac{1}{3} & -\frac{2}{3} \end{bmatrix} \begin{bmatrix} R \\ G \\ B \end{bmatrix} = \begin{bmatrix} L \\ C_1 \\ C_2 \\ C_3 \end{bmatrix}$$

Where:

R, G, and B represent the original red, green, and blue intensities at a particular pixel;

L represents the luminance signal; and, $C_1$, $C_2$, and $C_3$ represent the color difference signals.

In general, the calculation of each color difference signal is a linear combination of the red, green, and blue intensities of a pixel of the original image. The coefficients are such that the sum of the weights of the red, green, and blue coefficients must sum to 0.

Again referring to FIG. 2, the given tone scale function is input to the slope calculator 30. The original red, green, and blue pixel values are also input to the slope calculator 30. The purpose of the slope calculator 30 is to compute the local slope of the given tone scale function, evaluated for the current pixel being processed. In the preferred embodiment, the equation used to calculate the local slope of the given tone scale function is:

$$f' = \frac{f(\max(R,G,B)) - f(\min(R,G,B))}{\max(R,G,B) - \min(R,G,B)}$$

$$f' = \frac{f(1/3(R+G+B)+\Delta) - f(1/3(R+G+B)-\Delta)}{2\Delta}$$

If max(R,G,B)−min(R,G,B)>10 otherwise
Where:

Δ=a small constant. In the preferred embodiment, Δ=5;

f(x)=the value of the tone scale function, evaluated at x;

f'=local slope of the tone scale function;

max(a,b,c)=the maximum value of a, b, and c; and, min(a,b,c)=the minimum value of a, b, and c.

As an alternative embodiment, the slope of the tone scale function may be calculated as:

$$f' = \frac{f(1/3(R+G+B)+\Delta) - f(1/3(R+G+B)-\Delta)}{2\Delta}$$

Where:

Δ=a small constant. In this embodiment, Δ=5.

In a further alternative method of calculating the local slope of the given tone scale, the following equation may also be implemented by the slope calculator 30:

$$f' = \frac{1}{\max(R,G,B) - \min(R,G,B) + 1} \left[ \sum_{i=\min(R,G,B)}^{\max(R,G,B)} \frac{f(i+\Delta) - f(i-\Delta)}{2\Delta} \right]$$

Where:

All terms have been previously defined.

Those skilled in the art will realize that many alternative methods of calculating the local slope of the given tone scale function may be formulated. However, the variance between these alternative methods is low and will not introduce significant alterations from this description of the present invention.

Still referring to FIG. 2, the output of the slope calculator 30 is passed to the adjustment factor calculator 40. The purpose of the adjustment factor calculator 40 is to determine a scaling factor for the color difference signals, based upon the local slope of the tone scale function as determined by the slope calculator 20.

The adjustment factor calculator 40 calculates for each color difference signal $C_i$ (i=1,2, ...) an adjustment factor $H_i$ (i=1,2, ...). In the preferred embodiment, the adjustment factor is calculated by the formula:

$$H_i = \gamma_i (f'-f'_0) + f'_0$$

Where:

γi=slope influence factor. This parameter typically ranges from 0 to 1.0. In the preferred embodiment, γi=0.45 for all i;

f'=calculated local slope of tone scale function. The output of the slope calculator 30; and, $f'_0$=nominal slope constant. In the preferred embodiment, $f'_0$=1.0.

Those skilled in the art will realize that the exact formulation of the equation implemented by the adjustment factor calculator 40 for the purpose of calculating the adjustment factor may take on many forms without significantly deviating from the scope of the present invention.

In an alternative method for calculating the adjustment factor $H_i$ an additional term K, the color position weight, is introduced.

$$H_i = K\gamma_i (f'-f'_0) + f'_0$$

Where:

K=color position weight.

Figure 5:
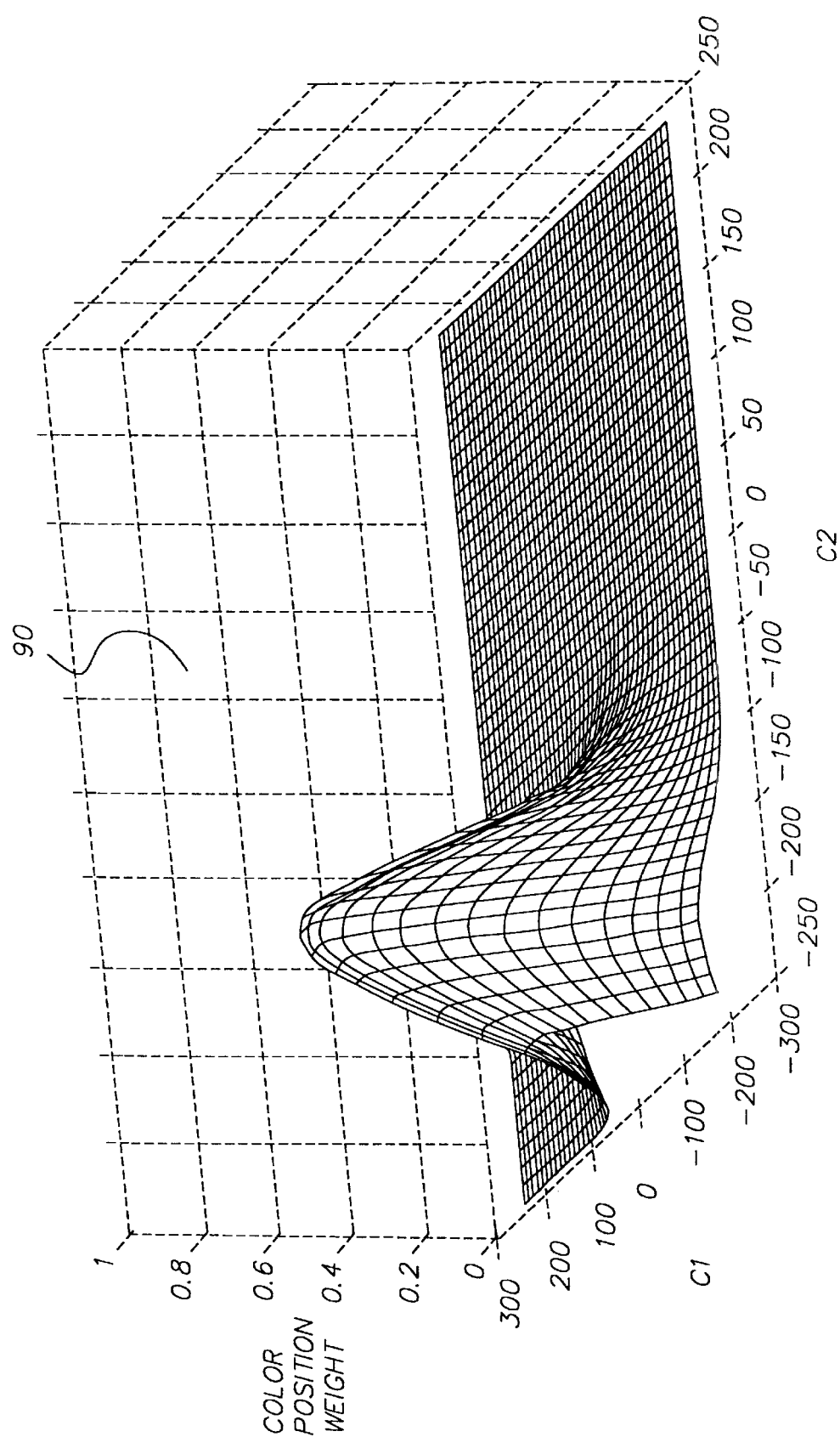

In general, the value of the color position weight K ranges from 0.0 to 1.0. The color position weight K enables the method of the present invention to allow the calculation of the adjustment factor $H_i$ to vary based upon the color characteristics of the pixel. In general, K is a function of the luminance L and color difference $C_i$ values. FIG. 5 illustrates the use of a two-dimensional LUT 90 as a method of determining the value of K for each pixel. As shown in FIG. 5, the value of the color position weight K is shown to be dependent upon the color differences $C_i$. The value of the color position weight K shown in FIG. 5 may also be derived analytically by the following mathematical formula:

$$K = \exp\left[\frac{-1}{2000}(0.23(C_1+95)^2 - 0.15(C_1+95)(C_2+170) + 0.36(C_2+170)^2)\right]$$

This formulation of the color position weight K allows the method of the present invention to adjust the color difference values of pixels that are colored similarly to human flesh (K~1.0), but preserve the original color difference values for pixels that are colored differently than human flesh (K~0.0). This embodiment has been found to be advantageous to avoid desaturation of saturated objects such as sky, while allowing for the required modifications to the color difference values of flesh color pixels.

Those skilled in the art will realize that the determination of a color position weight K may take many forms (such as introducing a luminance L value dependence into the determination of the color position weight K) without significantly deviating from the scope of the present invention.

Again referring to FIG. 2, the output of the adjustment factor calculator 40 is passed to the multiplier 50. The purpose of the multiplier 50 is to scale each of the color difference signals by the output of the adjustment factor calculator 40. The scaled color difference signals that are the output of the multiplier 50 are hereafter referred to as the compensated color difference signals. That is:

$$C_{pi} = C_i * H_i \text{ For i=1,2,}$$

Where:

$C_{pi}$=the output of multiplier 50. I.e. compensated color difference signal;

$C_i$=color difference signals; and, $H_i$=output of adjustment factor calculator 40.

Again referring to FIG. 2, the luminance signal L calculated by the color difference transformer may be passed to the tone scale applicator 60. However, in regard to the present invention, the given tone scale function may be applied to the image as a processing step following the application of the present invention. The tone scale applicator 60 modifies the luminance signal with the application of the given tone scale function. A Look-Up-Table may be implemented in order to apply the tone scale function. As an alternative method of applying the given tone scale function to the luminance signal L, the method of U.S. Pat. No. 5,012,333 may be implemented. In either of these cases, the signal output of the tone scale applicator is a function of the input luminance signal.

$$L_p = f(L)$$

Where:

$L_p$=the transformed luminance signal. I.e. the output of the tone scale applicator 60; and, f(x)=the value of the given tone scale function, evaluated at x. If the given tone scale represents the implied tonal response of a device in the image processing path, then $L_p$=L.

Again referring to FIG. 2, the compensated color difference signals and the luminance signal are passed to the RGB reconstructor 70. The RGB reconstructor 70 converts the image from a luminance signal and a plurality of color difference signals to an image containing at each pixel location red, green, and blue intensity values. This conversion is accomplished by the use of a matrix. If a three by three matrix was used by the color difference transformer 20, then the conversion performed by the RGB reconstructor is to simply multiply a vector of the luminance signal and two color difference signals by the inverse of the matrix used by the color difference transformer 20. In the preferred embodiment, $$\begin{bmatrix} 1 & -\frac{2}{3} & -1 \\ 1 & \frac{4}{3} & 0 \\ 1 & -\frac{2}{3} & 1 \end{bmatrix} \begin{bmatrix} L_p \\ C_{p1} \\ C_{p2} \end{bmatrix} = \begin{bmatrix} R_p \\ G_p \\ B_p \end{bmatrix}$$

Where:

$R_p$, $G_p$, and $B_p$ refer to the processed red, green, and blue pixels respectively.

If the alternative embodiment of using a 4×3 matrix is implemented, then three color difference channels are created. In that case, the RGB reconstructor 70 performs the following operation in order to produce $R_p$, $G_p$, and $B_p$ $$\begin{bmatrix} 1 & -1 & 0 & 0 \\ 1 & 0 & -1 & 0 \\ 1 & 0 & 0 & -1 \end{bmatrix} \begin{bmatrix} L \\ C_{p1} \\ C_{p2} \\ C_{p3} \end{bmatrix} = \begin{bmatrix} R_p \\ G_p \\ B_p \end{bmatrix}$$

In general, the product of the matrix used by the RGB reconstructor 70 and the matrix used by the color difference transformer 20 is an identity matrix.

The $R_p$, $G_p$, and $B_p$ signals are output from the RGB reconstructor 70. When considered together, these three processed color planes form a processed image in which the color difference signals have been modified in accordance with the luminance modification by a given tone scale function.

In an alternative embodiment to the present invention, it is possible that the image input to the color difference adjuster 10 may already have been modified by the given tone scale function. The given tone scale function may have been applied to either each of the color channels of the input image or to only the luminance channel of the given image.

Figure 3:
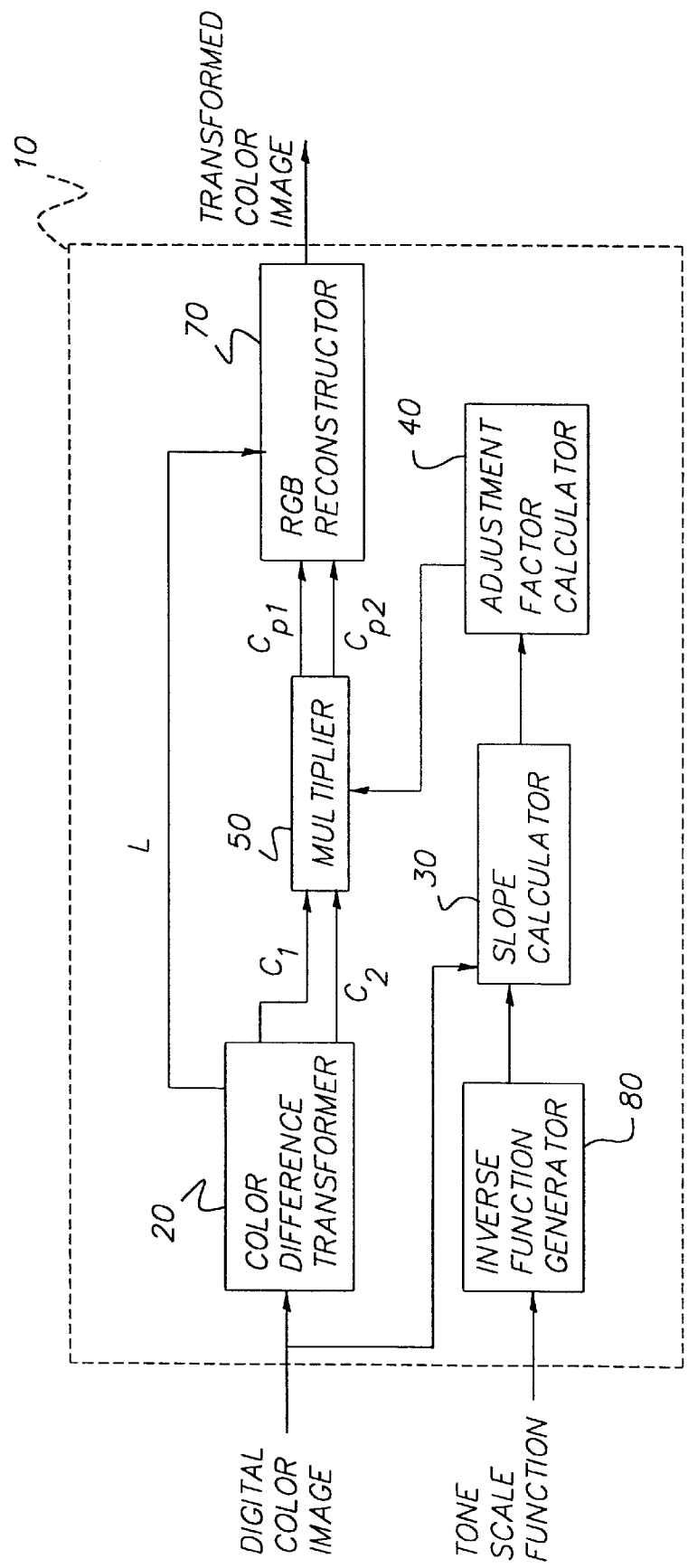
FIG. 3 is an exploded view of an alternative embodiment of the color difference adjuster of FIG. 1.

In the case where the given tone scale function has been applied to each of the color records of the input image, the alternative embodiment is illustrated by FIG. 3.

As illustrated in FIG. 3, the image input to the color difference adjuster 10 is first passed to the color difference transformer 20 in order to generate a luminance signal and several color difference signals. The color difference signals output from the color difference transformer 20 are passed to the multiplier, which scales each of the color difference channels by a factor output by the adjustment factor calculator 40, as previously described in the preferred embodiment. The modified color difference channels output from the multiplier 50 are, along with the luminance channel output from the color difference transformer 20, passed to the RGB reconstructor 70. The output of the RGB reconstructor 70 is a processed image with the color differences appropriately adjusted for the given tone scale function.

Again referring to FIG. 3, the tone scale function that has already been applied to each of the color channels of the input image is passed to the inverse function generator 80. The inverse function generator constructs the inverse of the tone scale function. Finding the inverse of a function is a well known technique in mathematics and will not be further discussed. The inverse tone scale function generated by the inverse function generator 80 is then passed to the slope calculator 30, the operation of which has previously been described. The output of the slope calculator is passed to the adjustment factor calculator 40, the operation of which has also been described.

Figure 4:
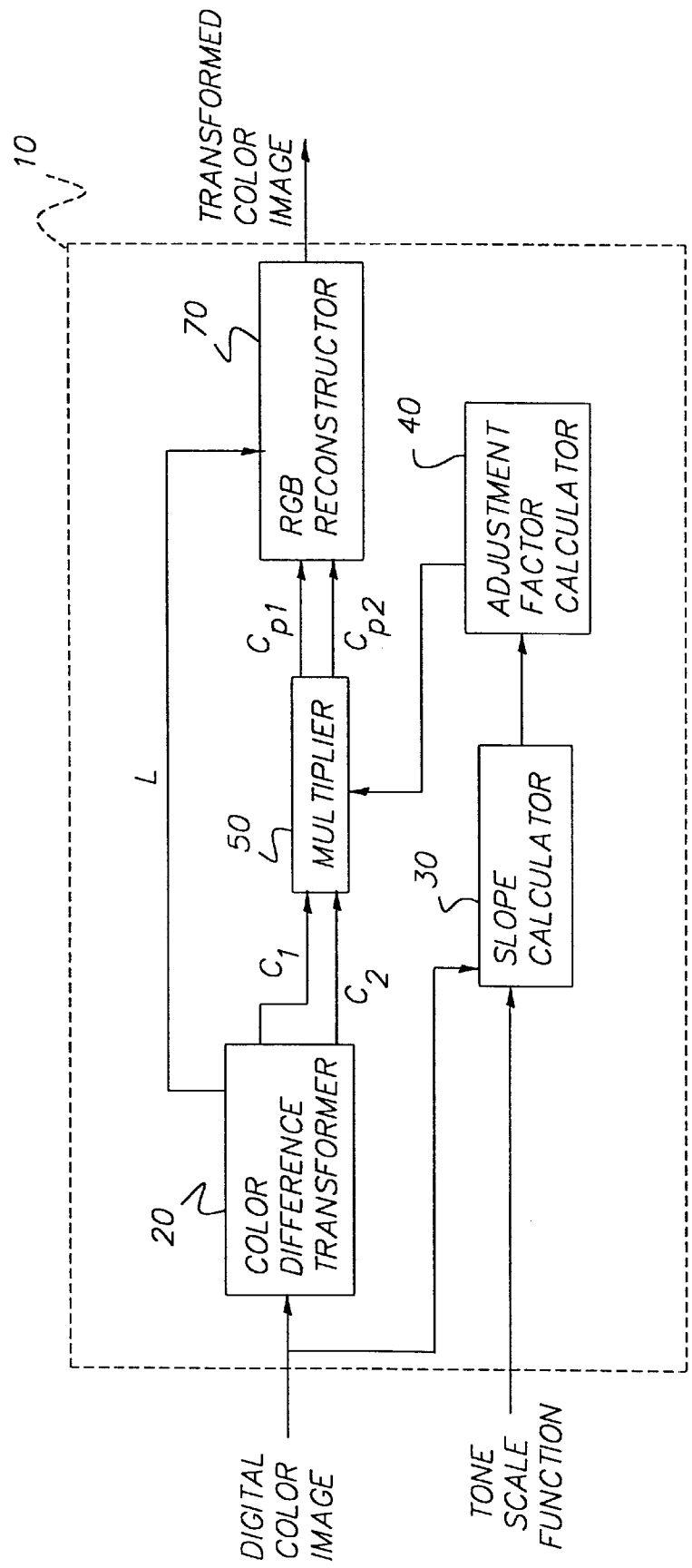
FIG. 4 is an exploded view of an alternative embodiment of the color difference adjuster of FIG. 1; and, FIG. 5 is a illustration of a two-dimensional LUT used to determine the color position weight K.

If the luminance signal of the image input to the color difference adjuster 10 has been modified by the given tone scale function prior to the image being passed to the color difference adjuster 10, then the alternative embodiment illustrated by FIG. 4 may be implemented to modify the color difference signals of the input image in an appropriate manner.

The alternative embodiment illustrated by FIG. 4 is identical to the preferred embodiment with the exception that there is no option to apply the given tone scale function to the luminance signal of the input image by the tone scale applicator 60 shown in FIG. 2. In the case of operating the present invention on a digital color image with a luminance signal modified by the given tone scale function prior to the application of the present invention, an additional tone scale applicator 60 would be redundant and was thus omitted from the alternative embodiment as illustrated in FIG. 4.

What is claimed is:

1. A method for processing a digital color image having a plurality of pixels, the method comprising the steps of:
   (a) receiving a tone scale function;
   (b) calculating a local slope of the tone scale function for each pixel of the digital color image based on a ratio calculation evaluated for each pixel;
   (c) calculating a color saturation signal from the digital color image, and
   (d) adjusting the color saturation signal of the digital color image for each of the pixels based on the calculated local slope.

2. The method as in claim 1 further comprising the steps of: transforming the digital color image into luminance and chrominance color signals; and modifying the luminance signal by the tone scale function.

3. The method as in claim 1, wherein the step of calculating the local slope of the tone scale function includes: determining a maximum and minimum value at a pixel location; determining an output of the tone scale function for both the maximum and minimum values; determining a difference of the maximum and minimum values; determining the difference of the output maximum and the output minimum values; and calculating a ratio of the difference of the output of the tone scale function for the maximum and minimum values to the difference of the maximum and minimum values.

4. The method as in claim 1, wherein the step of calculating the local slope of the tone scale function includes determining a luminance value at a pixel location; selecting an arbitrary small integer delta value; determining an output of the tone scale function for both the sum of the luminance value and the delta value, and the sum of the luminance value and the negative of the delta value; determining the difference of the output of the sum of the luminance value and the delta value and the output of the sum of the luminance value and the negative of the delta value; and calculating a ratio of the difference to twice the delta value.

5. The method as in claim 1 further comprising the step of providing a color position weight based upon the pixel value of the original digital color image.

6. The method as in claim 5, wherein the step of adjusting the color saturation signal of the digital color image is dependent upon both the calculated local slope and the color position weight.

7. The method as in claim 1, wherein the step of adjusting the color saturation signal is further comprised of: calculating one or more color difference signals; and adjusting the color difference signals of the digital color image for each of the pixels based on the calculated local slope.

8. The method as in claim 7 further comprising the steps of: transforming the digital color image into luminance and chrominance color signals; and modifying the luminance signal by the tone scale function.

9. The method as in claim 7, further wherein the step of calculating the local slope of the tone scale function includes: determining a maximum and minimum value at a pixel location; determining an output of the tone scale function for both the maximum and minimum values; determining a difference of the maximum and minimum values; determining the difference of the output maximum and the output minimum values; and calculating a ratio of the difference of the output of the tone scale function for the maximum and minimum values to the difference of the maximum and minimum values.

10. The method as in claim 7, wherein the step of calculating the local slope of the tone scale function includes: determining a luminance value at a pixel location; selecting an arbitrary small integer delta value; determining an output of the tone scale function for both the sum of the luminance value and the delta value, and the sum of the luminance value and the negative of the delta value; determining the difference of the output of the sum of the luminance value and the delta value and the output of the sum of the luminance value and the negative of the delta value; and calculating a ratio of the difference to twice the delta value.

11. The method as in claim 7 further comprising the step of providing a color position weight based upon the pixel value of the original digital color image.

12. The method as in claim 11, wherein the step of adjusting the color saturation signal of the digital color image is dependent upon both the calculated local slope and the color position weight.

* * * * *